United States Patent
Septon et al.

(10) Patent No.: US 12,381,722 B2
(45) Date of Patent: Aug. 5, 2025

(54) BI-DIRECTIONAL QUANTUM INTERCONNECTS

(71) Applicant: Mellanox Technologies, Ltd., Yokneam (IL)

(72) Inventors: Tali Septon, Haifa (IL); Elad Mentovich, Tel Aviv (IL); Yonatan Piasetzky, Tel Aviv (IL); Moshe B. Oron, Rehovot (IL); Isabelle Cestier, Haifa (IL)

(73) Assignee: Mellanox Technologies, Ltd., Yokneam (IL)

( * ) Notice: Subject to any disclaimer, the term of this patent is extended or adjusted under 35 U.S.C. 154(b) by 189 days.

(21) Appl. No.: 17/878,464

(22) Filed: Aug. 1, 2022

(65) Prior Publication Data
US 2024/0039711 A1   Feb. 1, 2024

(51) Int. Cl.
*H04B 10/70* (2013.01)
*H04L 9/08* (2006.01)

(52) U.S. Cl.
CPC ........... *H04L 9/0855* (2013.01); *H04B 10/70* (2013.01)

(58) Field of Classification Search
None
See application file for complete search history.

(56) References Cited

U.S. PATENT DOCUMENTS

| | | | | |
|---|---|---|---|---|
| 7,437,081 B2 * | 10/2008 | Mitchell | ................ | H04B 10/70 398/154 |
| 7,613,396 B2 * | 11/2009 | Maeda | ................... | H04B 10/70 398/43 |
| 8,116,636 B2 * | 2/2012 | Youn | ..................... | H04L 9/0858 398/198 |
| 8,433,070 B2 * | 4/2013 | Habif | ..................... | H04B 10/70 380/278 |
| 8,582,769 B2 * | 11/2013 | Zhao | ..................... | H04L 9/0852 380/256 |

(Continued)

OTHER PUBLICATIONS

Haitjema, Mart, A survey of the Prominent Quantum Key Distribution Protocols, 2007 (Year: 2007).*

(Continued)

*Primary Examiner* — Jai M Lee
(74) *Attorney, Agent, or Firm* — Michael M. McCraw; Moore & Van Allen PLLC

(57) ABSTRACT

Bi-directional quantum interconnects are provided that include a first communication module and a second communication module. The first communication module includes a first quantum transmitter and a first quantum receiver, and the second communication module includes a second quantum transmitter and a second quantum receiver. The example interconnect further includes a first communication medium communicably coupling the first communication module and the second communication module such that communication is provided between the first quantum transmitter and the second quantum receiver and between the second quantum transmitter and the first quantum receiver via the first communication medium. The first quantum transmitter and the second quantum transmitter generate qubits having first and second quantum characteristics, respectively, to allow for bi-directional quantum communication over a common channel.

20 Claims, 5 Drawing Sheets

(56) References Cited

U.S. PATENT DOCUMENTS

| | | | | |
|---|---|---|---|---|
| 10,110,378 | B2* | 10/2018 | Han | H04L 9/0852 |
| 10,205,592 | B2* | 2/2019 | Huang | H04L 9/0819 |
| 10,594,408 | B2* | 3/2020 | Bishop | H04B 10/70 |
| 10,999,069 | B2* | 5/2021 | Legré | H04B 10/70 |
| 11,632,175 | B2* | 4/2023 | Di Mola | H04B 10/61 |
| | | | | 398/139 |
| 11,777,723 | B2* | 10/2023 | Brunner | H04L 9/0858 |
| | | | | 380/278 |
| 11,876,566 | B2* | 1/2024 | Borrill | H04B 10/70 |
| 11,949,783 | B1* | 4/2024 | Wang | H04L 9/0855 |
| 2008/0175385 | A1* | 7/2008 | Lee | H04L 9/0855 |
| | | | | 380/278 |
| 2022/0222507 | A1* | 7/2022 | Wang | G06N 10/80 |
| 2022/0407688 | A1* | 12/2022 | Childe | H04B 10/118 |
| 2023/0078794 | A1* | 3/2023 | Rahman | H04L 9/0855 |
| | | | | 380/256 |
| 2023/0171003 | A1* | 6/2023 | Paudel | G06N 10/60 |
| | | | | 398/40 |
| 2023/0254130 | A1* | 8/2023 | Wang | H04L 9/0852 |
| | | | | 713/189 |
| 2023/0261763 | A1* | 8/2023 | Sivan | H04L 7/0087 |
| | | | | 370/276 |
| 2024/0056293 | A1* | 2/2024 | Kim | H04W 12/041 |
| 2024/0106637 | A1* | 3/2024 | Yeomans | H04L 45/42 |

OTHER PUBLICATIONS

"Bidirectional (BiDi) WDM Transceivers", Jun. 1, 2021 [online]. Retrieved from the internet < https://community.fs.com/blog/a-brief-introduction-of-bidi-sfp-transceiver.html>.

Liu, Xu et al., "An entanglement-based quantum network based on symmetric dispersive optics quantum key distribution". APL Photonics 5, 076104, Jul. 8, 2020 [online]. Retrieved from the Internet <https://doi.org/10.1063/5.0002595>.

Wengerows, S., et al. "An entanglement-based wavelength-multiplexed quantum communication network." Nature 564, 225-228. Dec. 12, 2018 [online]. Retrieved from the Internet <https://doi.org/10.1038/s41586-018-0766-y>.

* cited by examiner

BI-DIRECTIONAL QUANTUM INTERCONNECTS

TECHNOLOGICAL FIELD

Example embodiments of the present disclosure relate generally to quantum computing and, more particularly, to quantum communication applications, systems, protocols, devices, and/or components that are bi-directional.

BACKGROUND

Communication networks, systems, channels, and the like are employed in a variety of applications in order to transmit data from one location to another. Quantum communication systems leverage the laws of quantum mechanics (e.g., superposition, entanglement, etc.) to facilitate the transmission of information between two (2) or more nodes in a network, separate quantum processing units (QPUs), modules, etc. Through applied effort, ingenuity, and innovation, various deficiencies and problems associated with quantum communication channels have been solved by developing solutions that are configured in accordance with the embodiments of the present disclosure, many examples of which are described in detail herein.

BRIEF SUMMARY

Systems, apparatuses, and methods are disclosed herein for bi-directional quantum communication. An example bi-directional quantum interconnect may include a first module that includes a first quantum transmitter and a first quantum receiver. The interconnect may further include a second module including a second quantum transmitter and a second quantum receiver. The interconnect may further include a first communication medium communicably coupling the first module and the second module such that communication is provided between the first quantum transmitter and the second quantum receiver and between the second quantum transmitter and the first quantum receiver via the first communication medium.

In some embodiments, the first quantum transmitter may be configured to generate one or more qubits having one or more first quantum characteristics (e.g., quantum properties, physical properties, observables, and/or degrees of freedom (e.g., qubit state)), and the second quantum receiver may be configured to measure the one or more qubits having the one or more first quantum characteristics.

In some further embodiments, the second quantum transmitter may be configured to generate qubits having second quantum characteristics, and the first quantum receiver may be configured to measure the qubits having the second quantum characteristics.

In some further embodiments, at least one of the first quantum characteristics may differ from one of the second quantum characteristics.

In some still further embodiments, the first quantum characteristics may define at least a first encoding basis (e.g., basis of quantum state) for the qubits generated by the first quantum transmitter, and the second characteristics may define at least a second encoding basis for the qubits generated by the second quantum transmitter.

In some embodiments, the communication medium may include an optical fiber.

In some further embodiments, communication between the first quantum transmitter and the second quantum receiver and communication between the second quantum transmitter and the first quantum receiver may be provided by the same optical fiber.

In some embodiments, a transmission of qubits between the first quantum transmitter and the second quantum receiver and a transmission of qubits between the second quantum transmitter and the first quantum receiver may occur at substantially the same time.

In some embodiments, the first communication module may further include a first optical transceiver and the second communication module may further include a second optical transceiver. In such an embodiment, the first communication medium may further be configured to communicably couple the first optical transceiver and the second optical transceiver.

In some embodiments, the first quantum transmitter and the second quantum transmitter may each be configured to generate entangled pairs of qubits.

In some embodiments the bi-directional quantum interconnect may further include a third communication module that includes at least a third quantum receiver. In such an embodiment, the interconnect may include a second communication medium communicably coupling the first communication module and the third communication module such that communication is provided between the first quantum transmitter and the third quantum receiver via the second communication medium. In such an embodiment, the interconnect may further include a third communication medium communicably coupling the second communication module and the third communication module such that communication is provided between the second quantum transmitter and the third quantum receiver via the third communication medium.

In some further embodiments, the third quantum receiver may be configured to perform one or more measurement device independent (MDI) quantum key distribution (QKD) operations.

In some further embodiments, the third quantum receiver may be configured to perform one or more quantum correlation measurements and/or analysis operations (e.g., Bell-state measurement and/or by using a Hong-Ou-Mandel interferometer and/or other equivalent technology) to one or more qubits transmitted by the one or more first quantum transmitter(s) and the one or more second quantum transmitter(s). In some further embodiments, the third quantum transmitter may be configured to perform one or more quantum interconnect operations.

Additionally or alternatively, in some embodiments, the third communication module may further include a third quantum transmitter. In such an embodiment, the second communication medium may communicably couple the first communication module and the third communication module such that communication is provided between the third quantum transmitter and the first quantum receiver via the second communication medium. In such an embodiment, the third communication medium may communicably couple the second communication module and the third communication module such that communication is provided between the third quantum transmitter and the second quantum receiver via the third communication medium.

In some embodiments, the third quantum transmitter may be configured to generate one or more pairs of correlated (e.g., entangled) qubits. In some further embodiments, the third quantum transmitter may be configured to perform one or more entanglement-based quantum key distribution (QKD) operations. In some further embodiments, the third quantum transmitter may be configured to perform one or more quantum interconnect operations.

In some embodiments, the bi-directional quantum interconnect may further include computing device communicably coupled to at least one of the first communication module, the second communication module, or the third communication module.

In some further embodiments, the computing device may be configured to perform one or more quantum correlation analysis, quantum error analysis, and/or postprocessing operations.

In some embodiments, the first communication module, the second communication module, and the third communication module may be formed as a multi-nodal network. In such an embodiment the interconnect may further include a multiplexer and demultiplexer operably coupled to each of the first communication module, the second communication module, and the third communication module. In some further embodiments, the multi-nodal network may be formed as an N-node network (e.g., where N is a positive integer value) that includes, for example, the first communication module, the second communication module, and/or the third communication module. In some embodiments, the N-node network may further include one or more broadband quantum sources configured to realize broadband emission of quantum particles.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
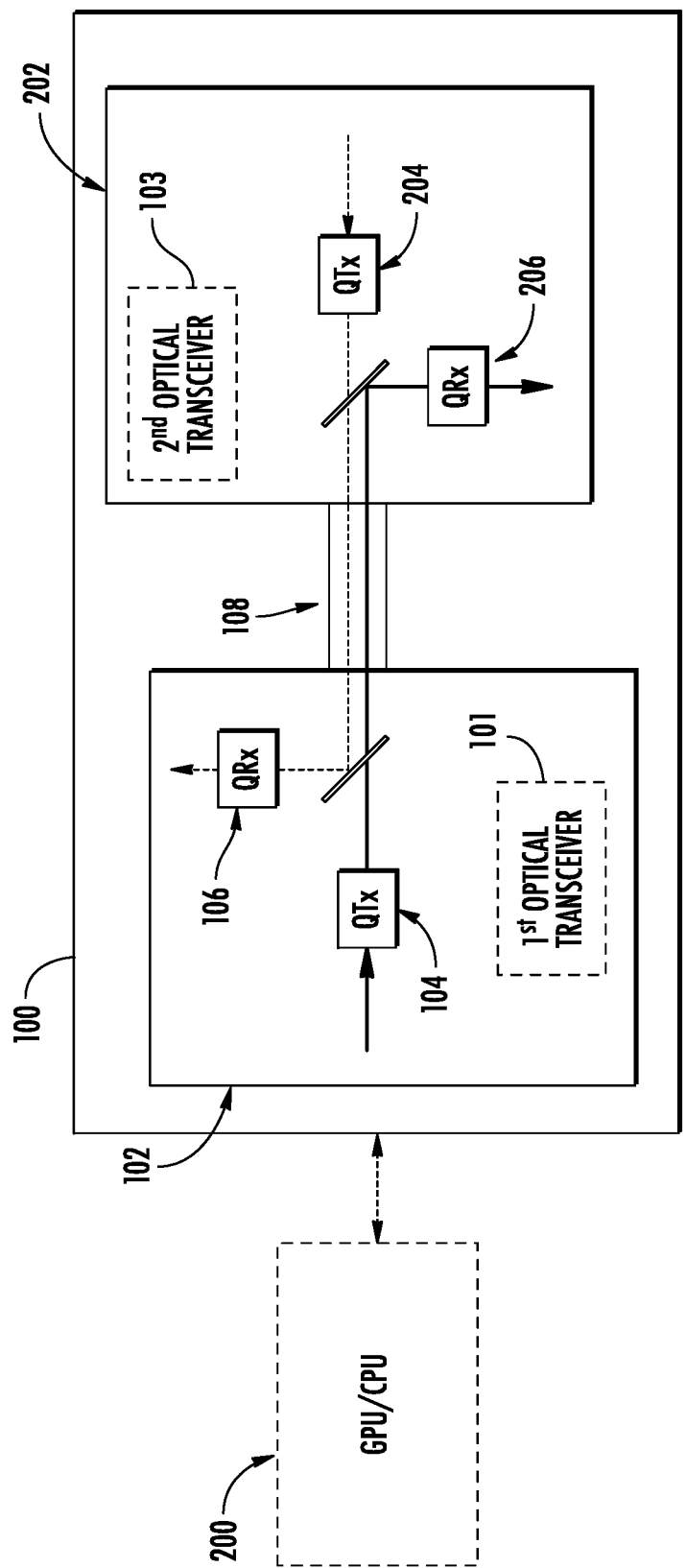
FIG. 1 illustrates an example bi-directional quantum interconnect with two (2) communication modules in accordance with one or more embodiments of the present disclosure.

Quantum computers represent an emerging type of computer that leverage the laws of quantum mechanics, such as superposition and entanglement, to solve certain computing problems exponentially faster than classical computers (e.g., transistor-based computers). In a quantum computer, the basic units of information are quantum bits (qubits), which are the quantum analog of binary bits in a classical computer. In general, the processing power of a quantum computer may be increased by increasing the number of qubits on the quantum computer. Quantum communication systems also leverage these laws of quantum mechanics (e.g., superposition, entanglement, etc.) to facilitate the transmission of information between two (2) communicating parties (e.g., applications such as quantum encryption to further secure or encrypt the underlying data) and/or separate quantum processors, modules, etc.

For example, a quantum communication channel may refer to a line (e.g., an optical fiber, a quantum line, trace, wire, cable, and/or free space) over which quantum data or information and particles, such as qubits, are exchanged using one or more quantum cryptographic techniques that rely on these quantum properties. One such cryptographic technique, Quantum Key Distribution (QKD), offers an encryption protocol with information-theoretic security (ITS). In particular, QKD techniques, whose security is based on the laws of nature, are resilient against all advances in classical computation and most quantum attacks and are therefore deemed quantum safe. Current quantum communication and QKD systems, however, often suffer from inefficient quantum key exchange rates due to inefficient single photon or quadrature sources, misaligned transmitter and receiver pairs used in basis preparation/detection, inefficient and/or noisy detectors, among others. Furthermore, these current quantum communication systems rely upon unidirectional transmission over quantum communication channels between transmitter and receiver pairs.

Thus, to address these and/or other issues, the embodiments of the present disclosure provide a bi-directional quantum interconnect in which a first communication module (e.g., a first quantum transmitter and first quantum receiver) is communicably coupled with a second communication module (e.g., a second quantum transmitter and second quantum receiver) via a communication medium (e.g., optical fiber, line, free space, etc.). This bi-directional quantum interconnect allows for qubits (e.g., photons or the like) to be transmitted in opposing directions across a common communication medium (e.g., the same optical fiber or otherwise) so as to substantially increase (e.g., double) the quantum exchange rate provided per quantum communication medium. To provide this bi-direction quantum communication, the embodiments described herein may generate qubits having different quantum characteristics (e.g., quantum properties, physical properties, observables, and/or degrees of freedom (e.g., qubit state)). For example, the first quantum transmitter may generate qubits (e.g., photons or the like) having first quantum characteristics for transmission to the second quantum receiver, and the second quantum transmitter may generate qubits having second, different quantum characteristics for transmission to the first quantum receiver. These differing quantum characteristics may ensure proper qubit transmission (e.g., eliminating or reducing interference) between communication modules. In doing so, the embodiments of the present disclosure may provide increased flexibility in creating new quantum network architectures that are realized using a new class of components, systems, and/or protocols. These new quantum network architectures are enabled by the present quantum bi-directional scheme.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Bi-Directional Quantum Interconnects

With reference to FIG. 1, an example bi-directional quantum interconnect 100 (e.g., interconnect 100) is illustrated. As shown, the interconnect 100 may include a first communication module 102 and a second communication module 202 communicably coupled by a first communication medium 108. The first communication module 102 may include a first quantum transmitter 104 configured to generate quantum particles (e.g., qubit) for transmission. A photon refers to a fundamental unit of electromagnetic radiation and, in quantum communication systems, may serve as the object within which data is encoded. The quantum basis of the qubits refers to the way in which data is encoded and/or the quantum information is carried, by the first quantum transmitter 104, where the data is the value of the encoded information. This encoding may be accomplished via sets of orthogonal quantum states, including, but not limited to, pairs of photonic polarization states, phase of single photons, time of arrival, optical frequency, quadratures, etc. The pairs of photonic polarization states may include, for example, the rectilinear, diagonal, and circular photonic polarization states. The rectilinear basis may refer to the pair of rectilinear photonic polarization states including the horizontal photon polarization state |0> and the vertical photon polarization state |1>. The diagonal basis may refer to the pair of diagonal and anti-diagonal photonic polarization states at 45 and 135 degrees, respectively. The circular basis may refer to the pair of circular photonic polarization states include the left circular photon polarization state |L> and the right circular photon polarization state |R>. The terms "state" or "states" may refer to a basic unit of quantum information comprising a two-level quantum mechanical system, such as the polarization of a single photon (e.g., a photon encoded using a quantum basis as described above).

Although described herein with reference to qubits transmitted via a quantum communication channel, the present disclosure contemplates that the techniques described herein may be applicable to quantum particles of any type. Furthermore, the basis (e.g., quantum state) of the qubit(s) transmitted by the first quantum transmitter 104 may be only one such example of a first quantum characteristic of the qubits transmitted by the first quantum transmitter 104. By way of a non-limiting example, the frequency, wavelength, and/or any other quantum characteristic, property, attribute, etc. of the qubits generated and transmitted by the first quantum transmitter 104 may be varied based upon the intended application of the first communication module 102. As described more fully hereinafter, the first quantum characteristics associated with the qubit (s) generated and transmitted by the first communication module 104 may be at least partially impacted by the quantum characteristics associated with other qubits transmitted within the same communication medium (e.g., quantum communication channel via an optical fiber or free space). Still further, the first quantum characteristics associated with the qubit(s) generated and transmitted by the first communication module 104 may be, in some embodiments, at least partially impacted or controlled by the equipment capabilities associated with the first quantum transmitter 104.

The first communication module 102 may further include a first quantum receiver 106 configured to receive (e.g., measure) qubits. As described hereafter, the first quantum receiver 106 may be configured to measure qubits that are received, via the first communication medium 108, from the second communication module 202 (e.g., generated by a second quantum transmitter 204). By way of continued example, the qubit serves as the object in quantum communication within which data is encoded, and the quantum basis of the qubit refers to a way in which data is encoded. As such, the first quantum receiver 106 may be configured to measure qubits having second quantum characteristics, such as a quantum basis state used to encode data, the frequency of the qubits, the wavelength of the qubits, and/or the like. As described hereafter, at least one of the second quantum characteristics may be different from at least one of the first quantum characteristics so that qubits having the first quantum characteristics (e.g., transmitted by the first quantum transmitter 104) and qubits having the second quantum characteristics (e.g., measured by the first quantum receiver 106) may exist in the same first communication medium 108. In other words, the second quantum characteristics, as defined by the second quantum transmitter 204 described hereafter, may be such that bi-directional communication via the first communication medium 108 may be achieved between the first communication module 102 and the second communication module 202. By way of a non-limiting example, time binning techniques, radio frequency (RF) modulation techniques, phase locking to shifted LOs (in the case of continuous variables), measurement using different basis, and/or any measurable physical attribute that may distinguish between an upstream channel and a downstream channel in the bi-directional communication implementations described herein may be used.

The second communication module 202 may include a second quantum transmitter 204 configured to generate qubits (e.g., photons or the like). The data of the qubits may be encoded via sets of orthogonal quantum states, including, but not limited to, pairs of photonic polarization states. The pairs of photonic polarization states may include, for example, the rectilinear, diagonal, and circular photonic polarization states as defined above. The second quantum characteristics associated with the qubit generated by the second quantum transmitter 204 may include the basis of the qubit(s) transmitted by the second quantum transmitter 204. Although described herein with reference to basis, the present disclosure contemplates that the second quantum characteristics may include the frequency, wavelength, and/or any other quantum characteristic, property, attribute, etc. of the qubits generated and transmitted by the second quantum transmitter 204 and that the second quantum characteristics may be varied based upon the intended application of the second communication module 202.

The second communication module 202 may further include a second quantum receiver 206 configured to receive (e.g., measure) qubits. Similar to the first quantum receiver 106, the second quantum receiver 206 may be configured to measure qubits that are received, via the first communication medium 108, from the first communication module 102 (e.g., generated by the first quantum transmitter 104). The second quantum receiver 206 may be configured to measure qubits having first quantum characteristics, such as the quantum basis used to encode data, the frequency of the qubits, the wavelength of the qubits, and/or the like.

The first communication medium 108, as shown in FIG. 1, is further configured to communicably couple the first communication module 102 and the second communication module 202 such that communication is provided between the first quantum transmitter 104 and the second quantum receiver 206 and between the second quantum transmitter 204 and the first quantum receiver 106 via the first communication medium 108. The first communication medium 108 may refer to an optical line, fiber, a quantum line, and/or free space over which quantum data or information and particles, such as qubits, are exchanged. These would include quantum communication channels used for applying one or more quantum cryptographic techniques (e.g., QKD) that rely on quantum properties, such as quantum uncertainty, superposition, and/or quantum entanglement. Although the first communication medium 108 is described herein with reference to a quantum communication channel, the present disclosure contemplates that the techniques described herein may be applicable to any communication channel. Furthermore, although described herein with reference to example embodiments in which the communication channel refers to an optical fiber or free space, the present disclosure contemplates that a communication channel may refer to any mechanism, structure (e.g., or absence thereof), or the like through which quantum information-based communications (e.g., photons, qubits, single or entangled quantum particles, etc.) may propagate or otherwise travel.

In some embodiments, the first communication medium 108 may include an optical fiber such that communication between the first quantum transmitter 104 and the second quantum receiver 206 and communication between the second quantum transmitter 204 and the first quantum receiver 106 is provided by the same optical fiber. In other words, a common communication medium is used for bi-directional quantum communication between the first communication module 102 and the second communication module 202. In such an embodiment, a transmission of qubits between the first quantum transmitter 104 and the second quantum receiver 206 and a transmission of qubits between the second quantum transmitter 204 and the first quantum receiver 106 may occur at the same or substantially the same time. Although described herein with reference to an optical fiber implementation, the present disclosure contemplates that the bi-directional quantum communication techniques described herein may also be applicable to instances in which the first communication medium 108 comprises a free space communication medium.

In an example bi-directional quantum communication operation, the first quantum transmitter 104 may receive instructions (e.g., from the GPU/CPU 200 and/or network card described hereafter) to generate and transmit qubits having first quantum characteristics (e.g., basis, frequency, wavelength, etc.). Similarly, the second quantum transmitter 204 may receive instructions (e.g., from the same GPU/CPU 200 or another computing device) to generate and transmit qubits having second quantum characteristics (e.g., basis, frequency, wavelength, etc.), one of which is different from the first quantum characteristics. The qubits may be transmitted from the first quantum transmitter 104 and the second quantum transmitter 204 to the second quantum receiver 206 and the first quantum receiver 106, respectively, via the same optical fiber (e.g., first communication medium 108). The second quantum receiver 206 may measure the qubits having the first quantum characteristics to receive the data encoded thereon. The first quantum receiver 106 may similarly measure the qubits having the second quantum characteristics to receive the data encoded thereon. The present disclosure contemplates that the bi-directional quantum interconnect 100 may leverage any computing device, GPU/CPU 200, or the like communicably coupled thereto in order to, in whole or in part, control operation of the first communication module 102 and the second communication module 202. Furthermore, in some embodiments, the first quantum transmitter 104 and/or the second quantum transmitter 204 may each configured to generated entangled pairs of qubits.

With continued reference to FIG. 1, in some embodiments, the bi-directional quantum interconnect 100 may employ classical communication channels, such as via optical transceivers. By way of a non-limiting example, the first communication module 102 may include a first optical transceiver 101 that is configured to generate optical signals (e.g., via a vertical cavity surface emitting laser (VCSEL) or the like) and receive optical signals (e.g., via a photodiode (PD) or the like). The second communication module 202 may include a second optical transceiver 103 that may similarly be configured to generate optical signals (e.g., via a vertical cavity surface emitting laser (VCSEL) or the like) and receive optical signals (e.g., via a photodiode (PD) or the like). These optical signals may also be transmitted via the first communication medium 108 (e.g., an optical fiber or the like) and be used to, for example, facilitate synchronization between the first communication module 102 and the second communication module 202. Although described herein with reference to example synchronization operations, the present disclosure contemplates that a classical communication channel, such as the paired first optical transceiver 101 and the second optical transceiver 103, may be used for any operation (e.g., transmission of data between parties, sifting operations, etc.) based upon the intended application of the bi-directional quantum interconnect 100.

Figure 2:
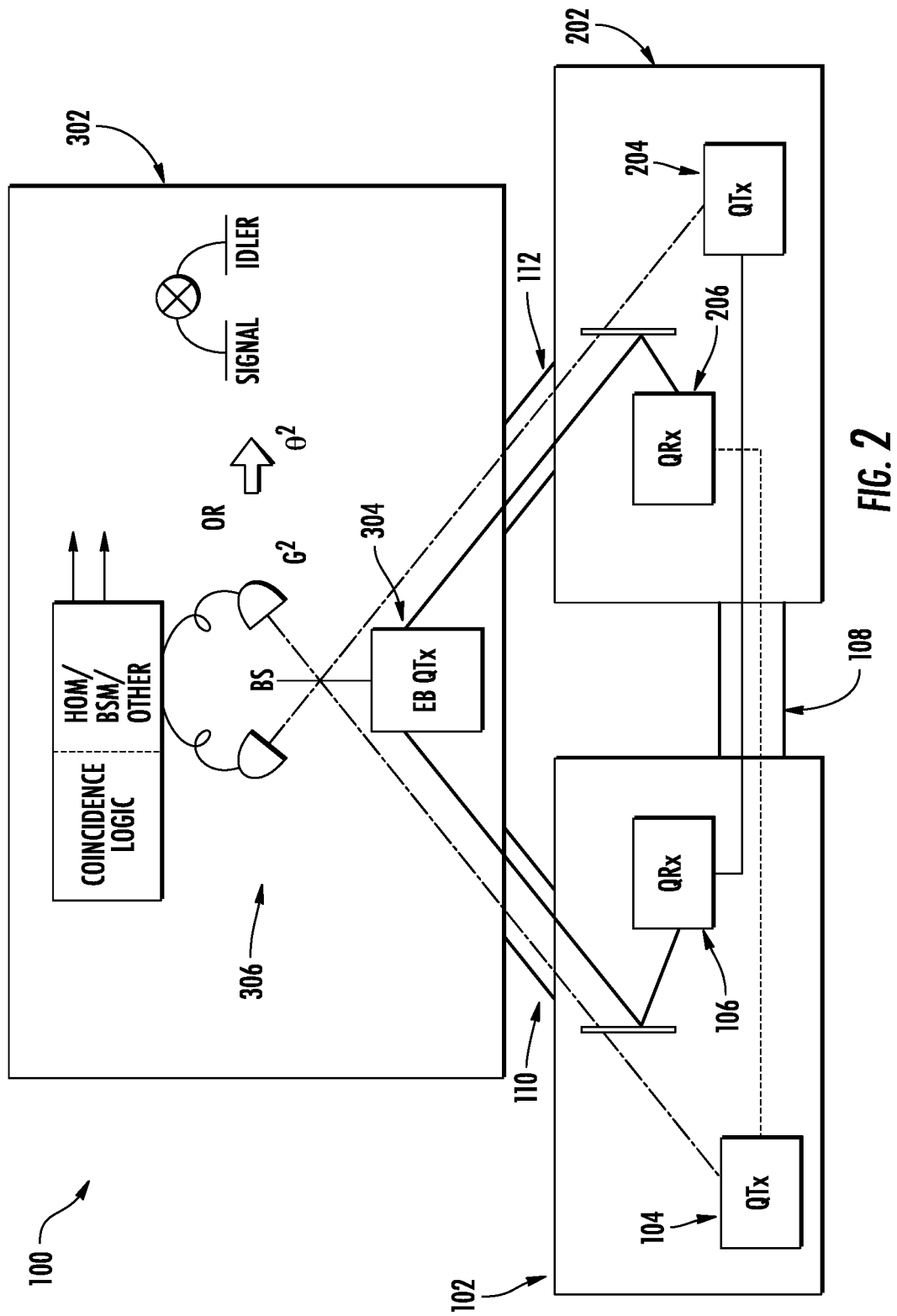
FIG. 2 illustrates an example bi-directional quantum interconnect with three (3) communication modules in accordance with one or more embodiments of the present disclosure.

In some embodiments, the bi-directional quantum interconnect techniques described above may also include multinodal implementations or any implementation in which three (3) or more communication modules are communicably coupled. With reference to FIG. 2, an example three (3) communication module implementation is illustrated. As shown, the bi-directional quantum interconnect 100 may further include a third communication module 302 that may include a third quantum receiver 306. Similar to the first quantum receiver 106 and the second quantum receiver 206, the third quantum receiver 306 may be configured to measure qubits and/or correlate two (2) or more qubits that are received from the first communication module 102 and/or the second communication module 202. As shown, the bi-directional quantum interconnect 100 may include a second communication medium 110 communicably coupling the first communication module 102 and the third communication module 302 such that communication is provided between the first quantum transmitter 104 and the third quantum receiver 306 via the second communication medium 110. The bi-directional quantum interconnect 100 may further include a third communication medium 112 communicably coupling the second communication module 202 and the third communication module 302 such that communication is provided between the second quantum transmitter 204 and the third quantum receiver 306 via the third communication medium 112.

The second communication medium 110 and/or the third communication medium 112 may each refer to an optical line, fiber, a quantum line, and/or free space over which quantum data or information and particles, such as qubits, are exchanged using one or more quantum cryptographic techniques (e.g., QKD) that rely on quantum properties, such as quantum uncertainty, superposition, and/or quantum entanglement. Although the second and third communication mediums 110, 112 are described herein with reference to a quantum communication channel, the present disclosure contemplates that the techniques described herein may be applicable to any communication channel. Furthermore, although described herein with reference to example embodiments in which the communication channel refers to an optical fiber or free space, the present disclosure contemplates that a communication channel may refer to any mechanism, structure (e.g., or absence thereof), or the like through which quantum information-based communications (e.g., photons, qubits, single or entangled quantum particles, etc.) may propagate or otherwise travel.

In some embodiments, the third quantum receiver 306 may operate similar to the bi-directional quantum interconnect 100 of FIG. 1 in which qubits are transmitted from the first quantum transmitter 104 to the third quantum receiver 306 via the second communication medium 110 and/or from the second quantum transmitter 204 to the third quantum receiver 306 via the third communication medium 112. In other embodiments, however, the third quantum receiver 306 may be configured to perform one or more measurement device independent (MDI) quantum key distribution (QKD) operations and/or quantum interconnect operations. In MDI based QKD operations, the third-party device (e.g., the third communication module 302) is configured to measure qubits (e.g., via the third quantum receiver 306) in order to determine a correlation of qubits transmitted by the first quantum transmitter 104 and the qubits transmitted by the second quantum transmitter 204. In doing so, the third quantum receiver 306 of the third communication module 302 does not determine the underlying value encoded and transported by the qubit(s) but confirms a correlation between the one or more qubits (e.g., so as to prevent transmission side attacks). In quantum interconnect operations, the third-party device (e.g., the third communication module 302) may be configured to measure qubits (e.g., via the third quantum receiver 306) in order to determine a correlation of qubits transmitted by the first quantum transmitter 104 and the qubits transmitted by the second quantum transmitter 204. In doing so, the third quantum receiver 306 of the third communication module 302 may determine entanglement between one or more devices (e.g., QPUs or the like) correlated and/or entangled with qubits of the first quantum transmitter 104 and another one or more devices (e.g., QPUs or the like) correlated and/or entangled with qubits of the first quantum transmitter 204.

With continued reference to FIG. 2, in addition to or alternative to the third quantum receiver 306, the third communication module 302 may include a third quantum transmitter 304. Similar to the first quantum transmitter 104 and the second quantum transmitter 204, the third quantum transmitter 304 may be configured to generate and transmit qubits. In some embodiments, the third quantum transmitter 304 may be configured to emit pairs of entangled, correlated, and/or heralded qubits. As shown, the second communication medium 110 may communicably couple the first communication module 102 and the third communication module 302 such that communication is provided between the first quantum receiver 106 and the third quantum transmitter 304 via the second communication medium 110. The third communication medium 112 may communicably couplie the second communication module 202 and the third communication module 302 such that communication is provided between the second quantum receiver 206 and the third quantum transmitter 304 via the third communication medium 112.

In some embodiments, the third quantum transmitter 304 may operate similar to the bi-directional quantum interconnect 100 of FIG. 1 in which qubits are transmitted from the third quantum transmitter 304 to the first quantum receiver 106 via the second communication medium 110 and/or from the third quantum transmitter 304 to the second quantum receiver 206 via the third communication medium 112. In other embodiments, however, the third quantum transmitter 304 may be configured to generate entangled qubit pairs and/or perform one or more entanglement-based (EB) quantum key distribution (QKD) operations with the first quantum receiver 106 via the second communication medium 110 and/or the second quantum receiver 206 via the third communication medium 112.

In EB based QKD operations, the quantum states of an entangled pair of qubits may be used such that a measurement on one of the qubits impacts the other of the qubits of the entangled pair. In other words, the third quantum transmitter 304 may generate an entangled pair of qubits that may be transmitted to one or more of the first quantum receiver 106 or the second quantum receiver 206 (e.g., one of the pair to the first quantum receiver 106 and the other of the pair to the second quantum receiver 206). If a malicious party, observer, eavesdropper, or the like performs a measurement on the transmitted entangled qubit, the third optical transmitter 304, the first quantum receiver 106 and/or the second quantum receiver 206 may be used to detect the presence of this malicious party, observer, or eavesdropper.

Figure 3:
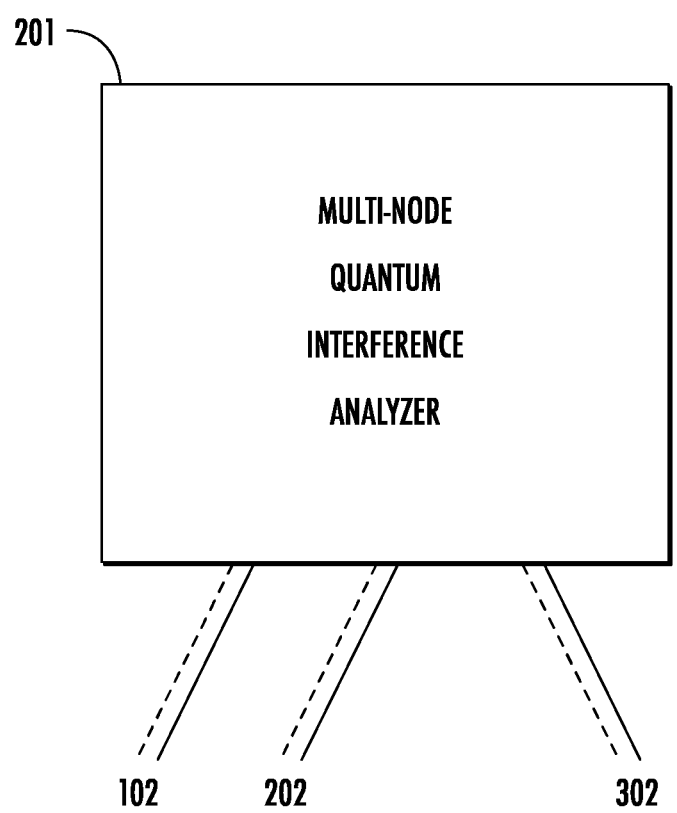
FIG. 3 illustrates an example multi-nodal quantum receiver for a bi-directional quantum interconnect with at least three (3) quantum receivers in accordance with one or more embodiments of the present disclosure.
Figure 4:
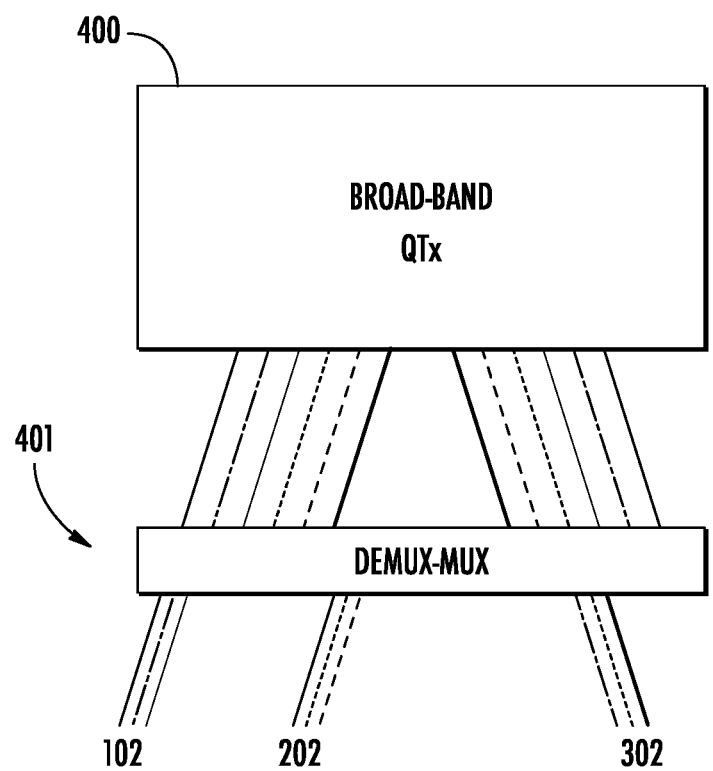
FIG. 4 illustrates an example multi-nodal quantum transmitter for a bi-directional quantum interconnect with at least three (3) quantum transmitters and/or a single multichannel transmitter module (e.g., broad-band quantum source) and a multiplexer/demultiplexer in accordance with one or more embodiments of the present disclosure.

With reference to FIGS. 3-4, example multi-nodal (e.g., N-nodal) quantum bi-directional communication implementations are illustrated. The techniques described above with reference to FIGS. 1-2 may be expanded to any number (e.g., N number) of nodes so as to support a scalable architecture for bi-directional quantum communication. For example, and as shown in FIG. 3, the first communication module 102, the second communication module 202, and the third communication module 302 may be formed as part of an N-node implementation communicably coupled to a multi-node quantum interference analyzer 201 (e.g., modules 102, 202, and 302 operate as quantum receiver modules). The multi-node quantum interference analyzer 201 may operate as a particular receiver that, in some embodiments, receives multiple qubits, applies quantum gates to the qubits, performs bell state (and/or other interference) measurements, analyzes the recorded data, and calculated/processes necessary correlations. Although illustrated and described herein with reference to a three (3) node implementation, the present disclosure contemplates that any number of bi-directional communication modules (e.g., nodes) may be used by the implementations described herein. In some embodiments, and as shown in FIG. 4, the multi-nodal network (N-may operate as a broadband quantum transmitter 400 in which a multiplexer and demultiplexer 401 are operably coupled to each of the first communication module 102, the second communication module 202, and the third communication module 302. Quantum multiplexing operates to minimize the number of qubits required in entanglement-based distributions while improving the quality of the quantum output. As would be evident in light of the present disclosure, the multiplexer and demultiplexer 401 may, respectively, be configured to combine several inputs into a common quantum output and split a common quantum output into respective inputs. Furthermore, the N broad-band quantum source 400 may be any component configured to realize broadband emission and/or multi-channel emission of quantum particles.

Example GPU/CPU

Figure 5:
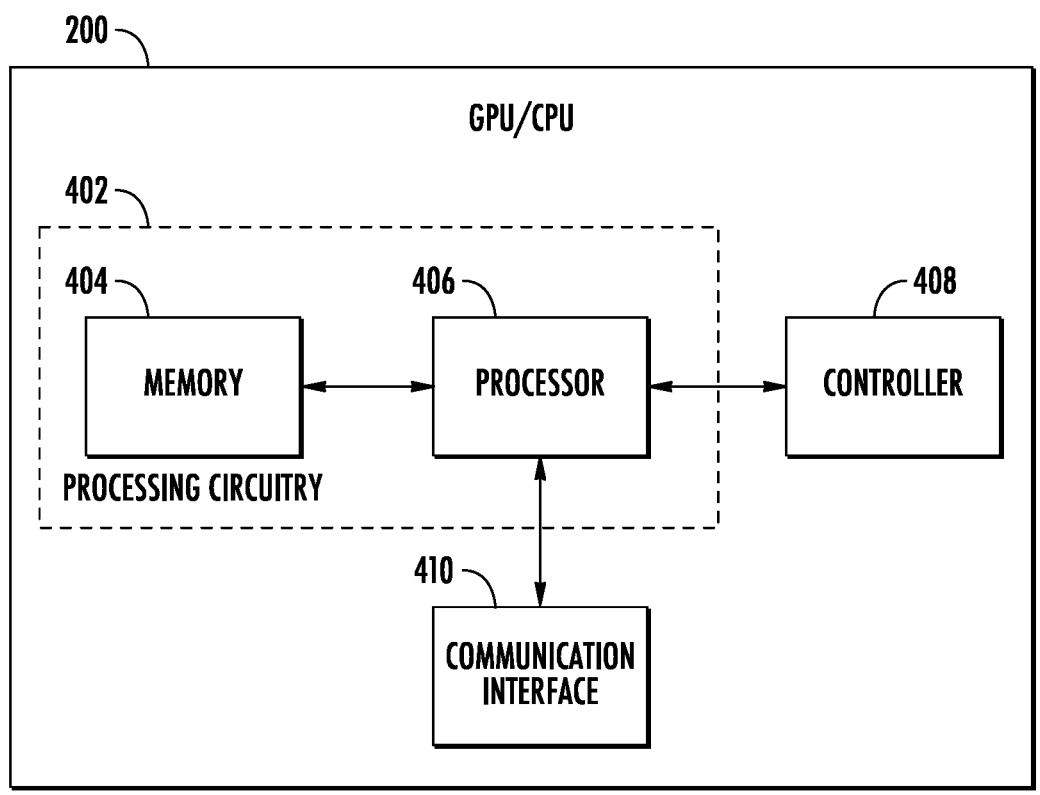
FIG. 5 illustrates an example graphics processing unit (GPU)/computer processing device (CPU) for use with some of the example embodiments described herein.

With reference to FIG. 5, a block diagram of the GPU/CPU 200 (e.g., a network card 200) is illustrated in accordance with some example embodiments. The GPU/CPU 200 may be communicably coupled to at least one of the first communication module 102, the second communication module 202, and/or the third communication module 302. However, it should be noted that the components, devices or elements illustrated in and described with respect to FIG. 5 below may not be mandatory and thus one or more may be omitted in certain embodiments. Additionally, some embodiments may include further or different components, devices or elements beyond those illustrated in and described with respect to FIG. 5.

The GPU/CPU 200 may include or otherwise be in communication with processing circuitry 402 that is configurable to perform actions in accordance with one or more example embodiments disclosed herein. In this regard, the processing circuitry 402 may be configured to perform and/or control performance of one or more functionalities of the GPU/CPU 200 in accordance with various example embodiments, and thus may provide means for performing functionalities of the GPU/CPU 200 in accordance with various example embodiments. The processing circuitry 402 may be configured to perform data processing, application execution and/or other processing and management services according to one or more example embodiments. In some embodiments, the GPU/CPU 200 or a portion(s) or component(s) thereof, such as the processing circuitry 402, may be embodied as or comprise a chip or chip set. In other words, the GPU/CPU 200 or the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The GPU/CPU 200 or the processing circuitry 402 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 402 may include a processor 406 and, in some embodiments, such as that illustrated in FIG. 5, may further include memory 404. The processing circuitry 402 may be in communication with or otherwise control a communication interface 410 and/or a controller 408. As such, the processing circuitry 402 may be embodied as a circuit chip (e.g., an integrated circuit chip) configured (e.g., with hardware, software or a combination of hardware and software) to perform operations described herein.

The processor 406 may be embodied in a number of different ways. For example, the processor 406 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 406 may comprise a plurality of processors. The plurality of processors may be in operative communication with each other and may be collectively configured to perform one or more functionalities of the GPU/CPU 200 as described herein. The plurality of processors may be embodied on a single computing device or distributed across a plurality of computing devices collectively configured to function as the GPU/CPU 200. In some example embodiments, the processor 406 may be configured to execute instructions stored in the memory 404 or otherwise accessible to the processor 406. As such, whether configured by hardware or by a combination of hardware and software, the processor 406 may represent an entity (e.g., physically embodied in circuitry—in the form of processing circuitry 402) capable of performing operations according to embodiments of the present disclosure while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software instructions, the instructions may specifically configure the processor 406 to perform one or more operations described herein.

In some example embodiments, the memory 404 may include one or more non-transitory memory devices such as, for example, volatile and/or non-volatile memory that may be either fixed or removable. In this regard, the memory 404 may comprise a non-transitory computer-readable storage medium. It will be appreciated that while the memory 404 is illustrated as a single memory, the memory 404 may comprise a plurality of memories. The plurality of memories may be embodied on a single computing device or may be distributed across a plurality of computing devices collectively configured to function as the GPU/CPU 200. The memory 404 may be configured to store information, data, applications, instructions and/or the like for enabling the GPU/CPU 200 to carry out various functions in accordance with one or more example embodiments. For example, the memory 404 may be configured to buffer input data for processing by the processor 406. Additionally or alternatively, the memory 404 may be configured to store instructions for execution by the processor 406. As yet another alternative, the memory 404 may include one or more databases that may store a variety of files, contents or data sets. Among the contents of the memory 404, applications may be stored for execution by the processor 406 in order to carry out the functionality associated with each respective application. In some cases, the memory 404 may be in communication with one or more of the processor 406, communication interface 410, or the controller 408 via a bus(es) for passing information among components of the GPU/CPU 200.

In some example embodiments, the GPU/CPU 200 may further include a communication interface 410. In some cases, the communication interface 410 may be any means such as a device or circuitry embodied in either hardware, or a combination of hardware and software that is configured to receive and/or transmit data from/to a network and/or any other device or circuitry in communication with the processing circuitry 402. By way of example, the communication interface 410 may be configured to enable the GPU/CPU 200 to communicate with the one or more communication modules and/or other quantum or classical computing devices. In this regard, for example, the communication interface 410 may be configured to be an analog to quantum communication bridge configured to covert physical layer digital signal representations from and/or to qubit states. The communication interface 410 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the GPU/CPU 200 may include or otherwise control a controller 408. As such, the controller 408 may be embodied as various means, such as circuitry, hardware, a computer program product comprising computer readable program instructions stored on a computer readable medium (for example, the memory 404) and executed by a processing device (for example, the processor 406), or some combination thereof. The controller 408 may be capable of communication with one or more of the memory 404 or communication interface 410 to access, receive, and/or send data as may be needed to perform one or more of the functionalities of the controller 408 as described herein.

Many modifications and other embodiments of the present disclosure will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A bi-directional quantum interconnect comprising:
   a first communication module comprising:
      a first quantum transmitter configured to generate qubits having a first quantum encoding basis; and
      a first quantum receiver;
   a second communication module comprising:
      a second quantum transmitter configured to generate qubits having a second quantum encoding basis different from the first quantum encoding basis; and
      a second quantum receiver; and
   a first communication medium communicably coupling the first communication module and the second communication module such that quantum communication, in opposing directions, occurs between the first quantum transmitter and the second quantum receiver and between the second quantum transmitter and the first quantum receiver via the first communication medium at the same time, wherein the first quantum encoding basis and the second quantum encoding basis are selected to prevent interference during bi-directional communication between the first communication module and the second communication module over the first communication medium.

2. The bi-directional quantum interconnect of claim 1, wherein the first quantum transmitter is configured to generate qubits having first quantum characteristics, and the second quantum receiver is configured to measure the qubits having the first quantum characteristics.

3. The bi-directional quantum interconnect of claim 2, wherein the second quantum transmitter is configured to generate qubits having second quantum characteristics, and the first quantum receiver is configured to measure the qubits having the second quantum characteristics.

4. The bi-directional quantum interconnect of claim 3, wherein at least one of the first quantum characteristics differs from one of the second quantum characteristics.

5. The bi-directional quantum interconnect of claim 1, wherein the first communication medium comprises an optical fiber.

6. The bi-directional quantum interconnect of claim 5, wherein communication between the first quantum transmitter and the second quantum receiver and communication between the second quantum transmitter and the first quantum receiver is provided by the same optical fiber.

7. The bi-directional quantum interconnect of claim 5, wherein a transmission of qubits between the first quantum transmitter and the second quantum receiver and a transmission of qubits between the second quantum transmitter and the first quantum receiver occurs simultaneously.

8. The bi-directional quantum interconnect of claim 1, wherein the first communication module further comprises a first optical transceiver, and the second communication module further comprises a second optical transceiver, the first communication medium further configured to communicably couple the first optical transceiver and the second optical transceiver.

9. The bi-directional quantum interconnect of claim 1, wherein at least the first quantum transmitter is configured to generate entangled pairs of qubits.

10. The bi-directional quantum interconnect of claim 1, further comprising:
   a third communication module comprising at least a third quantum receiver;
   a second communication medium communicably coupling the first communication module and the third communication module such that communication is provided between the first quantum transmitter and the third quantum receiver via the second communication medium; and
   a third communication medium communicably coupling the second communication module and the third communication module such that communication is provided between the second quantum transmitter and the third quantum receiver via the third communication medium.

11. The bi-directional quantum interconnect of claim 10, wherein the third quantum receiver is configured to perform one or more measurement device independent (MDI) quantum key distribution (QKD) operations.

12. The bi-directional quantum interconnect of claim 10, wherein:
the third communication module further comprises a third quantum transmitter;
the second communication medium communicably couples the first communication module and the third communication module such that communication is provided between the third quantum transmitter and the first quantum receiver via the second communication medium; and
the third communication medium communicably couples the second communication module and the third communication module such that communication is provided between the third quantum transmitter and the second quantum receiver via the third communication medium.

13. The bi-directional quantum interconnect of claim 12, wherein the third quantum transmitter is configured to generate entangled, heralded, and/or correlated pairs of qubits so as to perform one or more entanglement-based quantum key distribution (QKD) operations and/or quantum interconnect operations.

14. The bi-directional quantum interconnect of claim 12, further comprising a computing device communicably coupled to at least one of the first communication module, the second communication module, or the third communication module.

15. The bi-directional quantum interconnect of claim 12, wherein the first communication module, the second communication module, and the third communication module are formed as part of a N-node network.

16. The bi-directional quantum interconnect of claim 15, further comprising a broadband quantum source and multiplexer/demultiplexer operably coupled to each of the first communication module, the second communication module, and the third communication module.

17. The bi-directional quantum interconnect of claim 1, further comprising:
a third communication module comprising at least a third quantum transmitter;
a second communication medium communicably coupling the first communication module and the third communication module such that communication is provided between the third quantum transmitter and the first quantum receiver via the second communication medium; and
a third communication medium communicably coupling the second communication module and the third communication module such that communication is provided between the third quantum transmitter and the second quantum receiver via the third communication medium.

18. The bi-directional quantum interconnect of claim 17, wherein the third quantum transmitter is configured to generate entangled, heralded, and/or correlated pairs of qubits so as to perform one or more entanglement-based quantum key distribution (QKD) operations and/or quantum interconnect operations.

19. The bi-directional quantum interconnect of claim 1, wherein qubits generated by the first quantum transmitter exist in the first communication medium at the same time as qubits generated by the second quantum transmitter.

20. The bi-directional quantum interconnect of claim 1, wherein bi-directional transmission of qubits generated by the first quantum transmitter and qubits generated by the second quantum transmitter occurs simultaneously over the first communication medium.

\* \* \* \* \*